United States Patent [19]

Sakonjyu et al.

[11] Patent Number: 5,434,786
[45] Date of Patent: Jul. 18, 1995

[54] VEHICLE SPEED CONTROLLING APPARATUS AND METHOD FOR CONTROLLING SPEED OF VEHICLE WITH AUTOMATIC TRANSMISSION

[75] Inventors: Kazutaka Sakonjyu; Eisaku Hori, both of Yokohama, Japan

[73] Assignee: Jidosha Denki Kogyo Kabushiki Kaisha, Yokohama, Japan

[21] Appl. No.: 149,742

[22] Filed: Nov. 10, 1993

[30] Foreign Application Priority Data

Nov. 12, 1992 [JP] Japan .................................. 4-302550

[51] Int. Cl.$^6$ .............................................. B60K 31/00
[52] U.S. Cl. .............................. 364/426.04; 180/179; 123/352
[58] Field of Search ................... 364/426.04; 180/179; 123/352

[56] References Cited

U.S. PATENT DOCUMENTS

| 5,023,792 | 6/1991 | Shioyama ........................ 364/426.04 |
| 5,121,323 | 6/1992 | Yamamoto et al. ............. 364/426.04 |
| 5,127,487 | 7/1992 | Yamamoto et al. ................. 180/179 |

*Primary Examiner*—Kevin J. Teska
*Assistant Examiner*—Susan Wieland
*Attorney, Agent, or Firm*—Sughrue, Mion, Zinn, Macpeak & Seas

[57] ABSTRACT

A vehicle speed control method and apparatus are provided which can ensure a smooth driving feeling even if an automotive vehicle has entered into an ascending sloped road during a constant speed control. The speed increasing control is stopped when the vehicle speed data obtained from the vehicle speed sensor is not greater than the memory vehicle speed, a deviation between the vehicle speed data and the memory vehicle speed is greater than a predetermined level and the acceleration at that time is greater than a predetermined level.

2 Claims, 4 Drawing Sheets

VEHICLE SPEED CONTROLLING APPARATUS AND METHOD FOR CONTROLLING SPEED OF VEHICLE WITH AUTOMATIC TRANSMISSION

BACKGROUND OF THE INVENTION

1. Field of the Invention

The present invention relates to a method and apparatus for controlling an automatic constant speed running apparatus which is used for automatically running an automotive vehicle at a preselected speed without any need to operate an accelerator pedal by automatically holding the traveling speed of the automotive vehicle at the preselected vehicle speed.

2. Description of the Prior Art

The Japanese Patent Examined Publication No. Hei 3-27412 shows an automatic constant speed running apparatus for automatically running a vehicle at a preselected vehicle speed.

In FIG. 4 which shows a control operation of an automatic constant speed running apparatus disclosed in the above-described publication, when the vehicle reaches an ascending sloped road during a constant speed control and a calculation result from a deviation of an actual vehicle speed relative to a memory vehicle speed and an acceleration obtained from a change rate of the actual vehicle speed per constant time is negative at a position a, a controller carries out a speed increasing control to an actuator in order to identify the actual vehicle speed with the memory vehicle speed. The speed increasing control is effected for a period of time obtained through the computation of the controller by using the deviation of the actual vehicle speed relative to the memory vehicle speed and the above-described acceleration. When the speed increasing control is effected to the actuator, a throttle valve connected to the actuator is opened to increase the speed of the vehicle so as to cause the actual vehicle speed to follow the memory vehicle speed.

When the predetermined computation result from the deviation of the actual vehicle speed relative to the memory vehicle speed and the acceleration obtained from the change rate of the actual vehicle speed per constant time becomes positive, the controller carries out a speed decreasing control to close the throttle valve to reduce the speed of the vehicle so as to cause the actual vehicle speed to follow the memory vehicle speed.

In the conventional automatic constant speed running apparatus, the predetermined computation result from the deviation of the actual vehicle speed relative to the memory vehicle speed and the acceleration obtained from the change rate of the actual vehicle speed per constant time becomes negative to thereby open the throttle valve. Accordingly, the opening degree of the throttle valve during the ascending sloped road running state is greater than that in the flat road running state. As a result, there is a fear that a shift-down control of an automatic transmission would be carried out from an overdrive (OD) mode to a drive (D3) mode at a position b in FIG. 4. If the shift-down control is effected by the automatic transmission, the actual vehicle speed is attenuated to the memory vehicle speed due to the increase of the engine torque. However, the engine torque is rapidly increased by the shift-down control under the condition that the throttle valve is kept opened. As a result, a so-called overshoot is generated and a plus deviation relative to the memory vehicle speed is generated at a position c. When the plus deviation is generated, the controller carries out the speed decreasing control to close the throttle valve. As a result of the closure of the throttle valve, the automatic transmission carries out the shift-up control from the drive (D3) mode to the overdrive (OD) mode in response to the opening degree of the throttle valve. As a result, in the case where the vehicle runs along a long ascending slope road, the foregoing control is repeatedly effected, resulting in degradation of running feeling. It is desired to overcome this problem.

SUMMARY OF THE INVENTION

An object of the present invention is to provide a vehicle speed controlling apparatus and method for controlling the speed of a vehicle with an automatic transmission in which it is possible to reduce the number of repetitions of the shift-down and shift-up by the automatic transmission, i.e., shift hunchings which would be encountered when the vehicle has reached the ascending sloped road during the constant speed control, thereby obtaining a smooth running feeling.

In order to attain this and other objects, according to the present invention, there is provided a vehicle speed control apparatus and method comprising: a vehicle speed sensor for generating vehicle speed data in proportion to an actual vehicle speed; an actuator for driving a throttle valve; a command switch for generating a cruise command signal by a driver's operation; and a control unit having a vehicle speed storage means for storing the vehicle data from the vehicle speed sensor and setting a memory vehicle speed in response to the cruise command signal when the command switch operates; and a microcomputer for computation of a deviation between the memory vehicle speed set by the vehicle speed storage means and the vehicle speed obtained from the vehicle speed sensor within a predetermined constant period of time and an acceleration obtained in accordance with a change rate of the vehicle speed data obtained from the vehicle speed sensor and for speed increasing/decreasing control of the actuator in response to a result of the computation, the control method comprising stopping the speed increasing control when the vehicle speed data obtained from the vehicle speed sensor is not greater than the memory vehicle speed, a deviation between the vehicle speed data and the memory vehicle speed is greater than a predetermined level and the acceleration at that time is greater than a predetermined level.

In the control method for the automatic constant speed running apparatus according to the invention, when the deviation between the vehicle speed data obtained from the vehicle sensor and the memory vehicle speed exceeds a predetermined range, the control means recognizes that the vehicle has reached the ascending sloped road. At the same time, the control means calculates the acceleration at the time when the vehicle has reached the ascending sloped road. If the calculated acceleration exceeds a predetermined level, the vehicle is caused to run under the constant speed running control while the speed increasing control output is stopped during the ascending sloped road running in order to recognize that the vehicle having reached the ascending sloped road runs without any need of the normal speed increasing control.

DESCRIPTION OF THE PREFERRED EMBODIMENTS

A control method and an automatic constant speed running apparatus according to one embodiment of the invention will now be described with reference to FIGS. 1 to 3.

Figure 1:
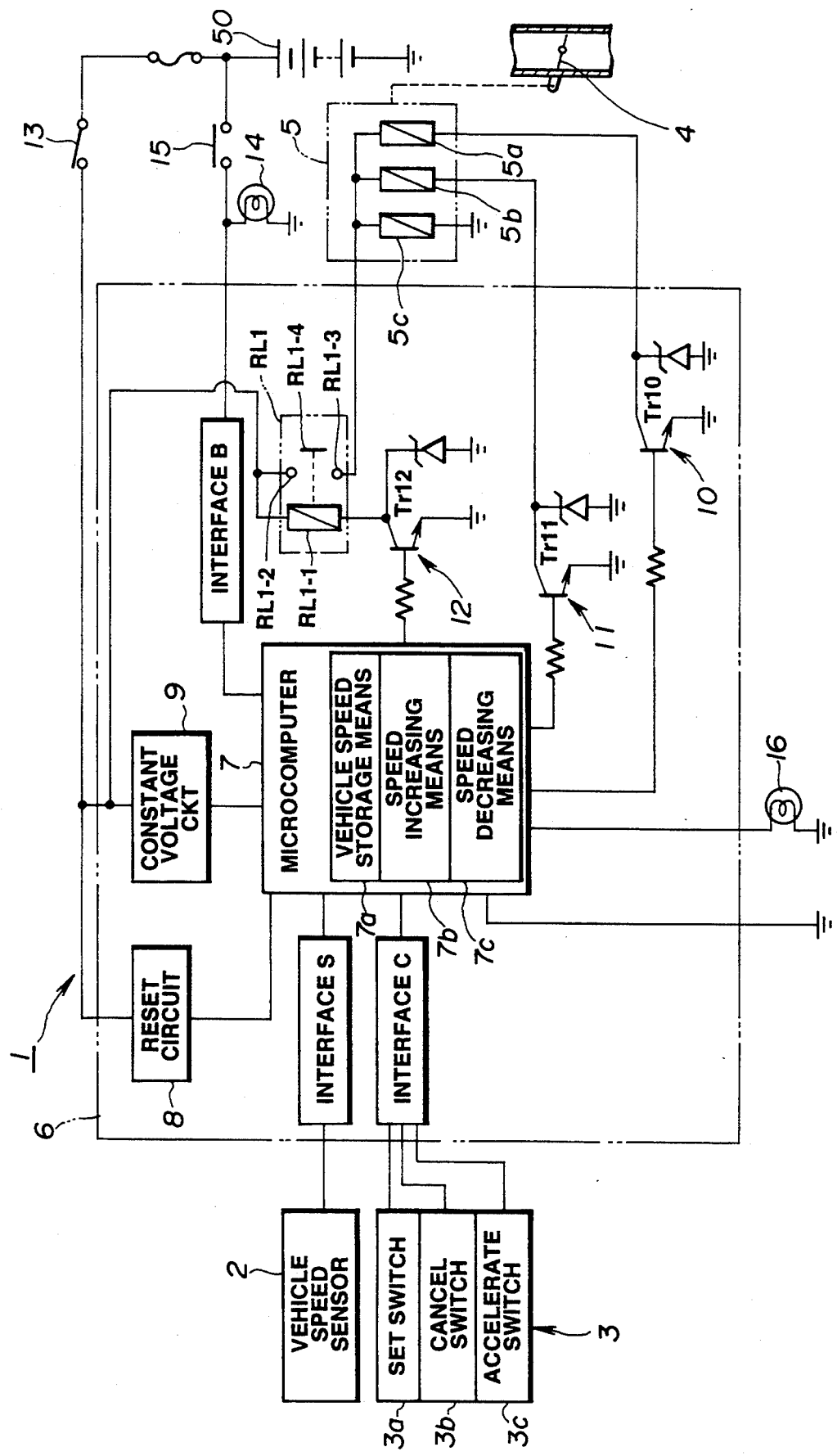
FIG. 1 is a circuit diagram showing an automatic constant speed running apparatus for illustrating a control method in accordance with one embodiment of the invention.
Figure 2:
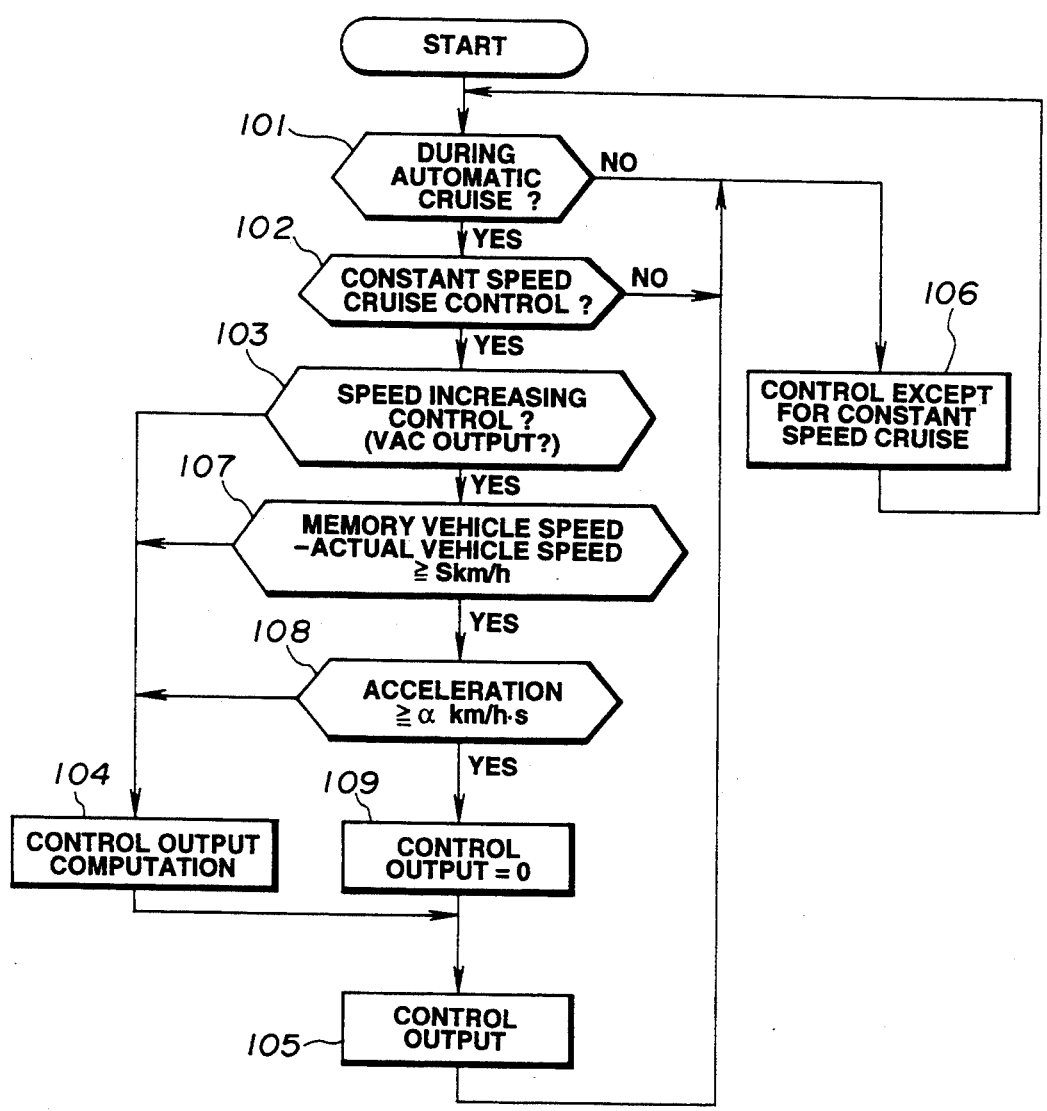
FIG. 2 is a flowchart for illustrating the control operation according to the control method for the automatic constant speed running apparatus shown in FIG. 1.
Figure 3:
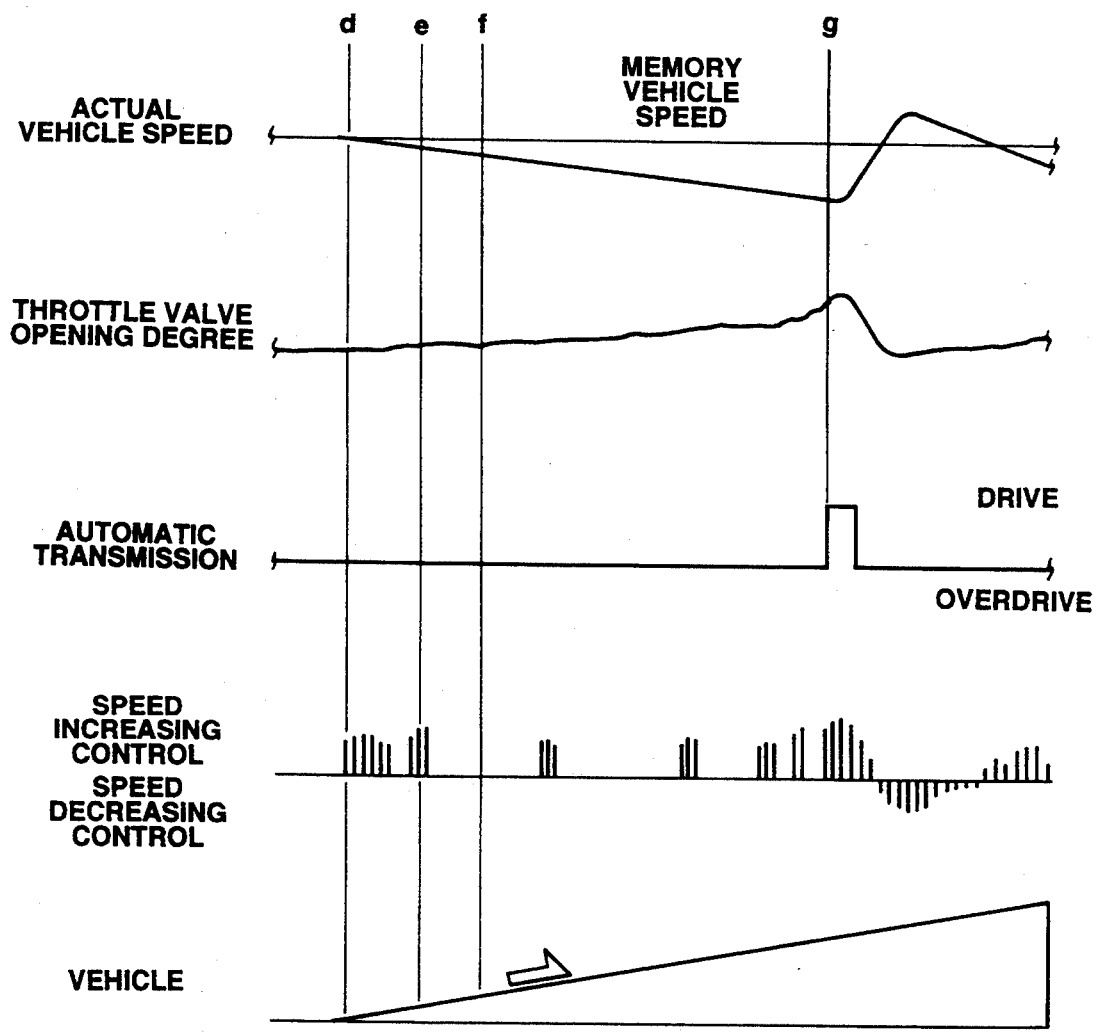
FIG. 3 is an illustration of a concept of the control method for the automatic constant speed running apparatus shown in FIG. 1.
Figure 4:
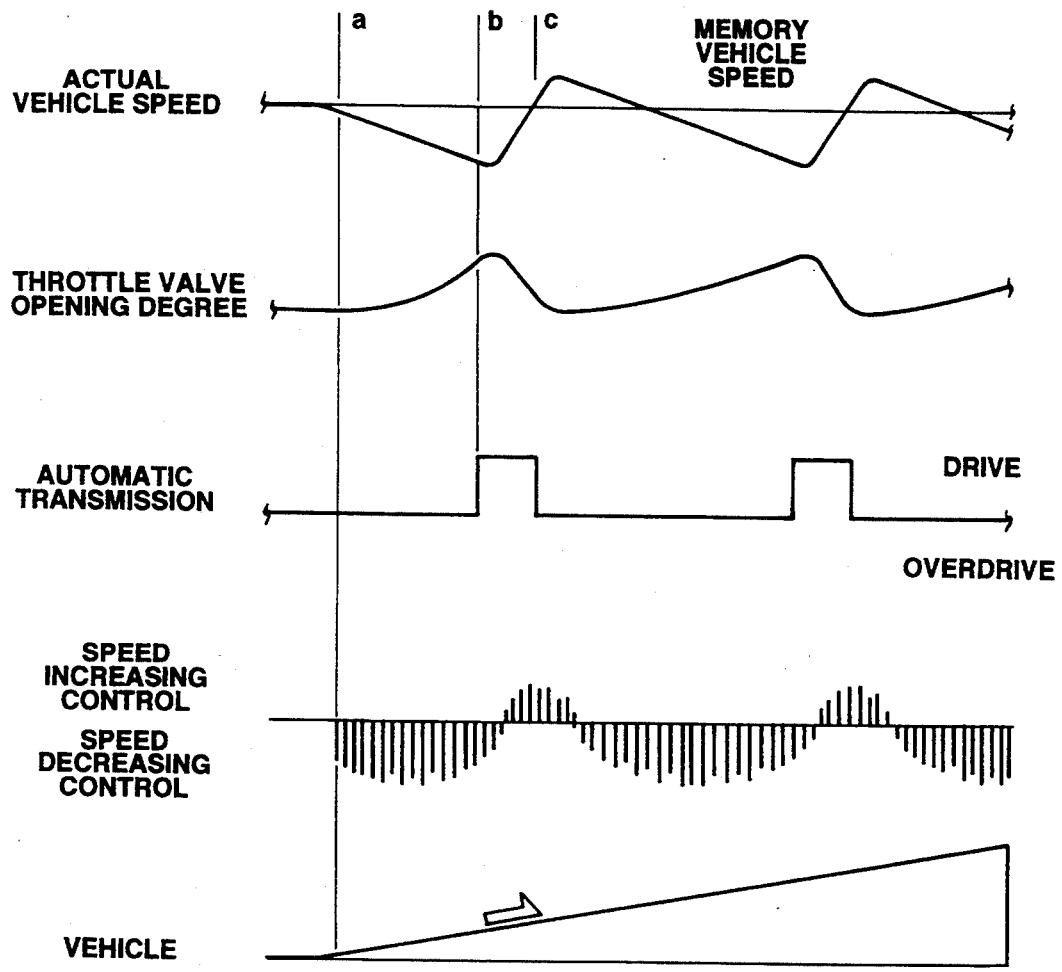
FIG. 4 is an illustration for a conventional control method for an automatic constant speed running apparatus.

FIG. 1 is a circuit diagram, FIG. 2 is a flowchart for illustrating a control operation and FIG. 3 is an illustration of a concept of the control.

The automatic constant speed running apparatus 1 shown in FIG. 1 is composed mainly of a vehicle speed sensor 2, a command switch 3 having a set switch 3a, a cancel switch 3b and an accelerate switch 3c, an actuator 5 connected to a throttle valve 4, and a control unit 6 for processing information from the vehicle speed sensor 2 and the command switch 3 to control the actuator 5. The control unit 6 is provided with a microcomputer 7.

The vehicle speed sensor 2 is incorporated into a speedometer (not shown) for always generating vehicle speed data in proportion to the actual vehicle speed in the form of pulse signals. The vehicle speed data from the vehicle speed sensor 2 are transferred to the microcomputer 7 through an interface S provided in the control unit 6.

When the set switch 3a provided in the command switch 3 is actuated by the driver from an on-operation to an off-operation, a cruise command signal is generated, and the cruise command signal is transferred to the microcomputer 7 through an interface C provided in the control unit 6. Also, when the set switch 3a is turned on for a predetermined period of time or more, a speed decreasing command signal is generated. The speed decreasing command signal is transferred to the microcomputer 7 through the interface C.

When the cancel switch 3b provided in the command switch 3 is turned on by the driver, a cancel command signal is generated and is transferred from the cancel switch 3b to the microcomputer 7 through the interface C.

When the accelerate switch 3c provided in the command switch 3 is turned on by the driver, an accelerate command signal is generated corresponding to a period of time when the accelerate switch 3c is kept turned on. The accelerate command signal is transferred to the microcomputer 7 through the interface C. Also, after the release of the system by operating a brake pedal or switching over to a parking position or a neutral position of an automatic transmission, when the accelerate switch 3c is turned on by the driver, the accelerate switch 3c has a function to recall the memory vehicle speed before the release of the system.

The control unit 6 is provided with the above-described microcomputer 7, a reset circuit 8, a constant voltage circuit 9, an interface B, a relay RL1, vent valve switching section 10, a vacuum valve switching section 11, and an actuator power source switching section 12.

The reset switch 8 and the constant voltage circuit 9 are connected at one side to a power source 50 through a main switch 13 and at the other side to the microcomputer 7.

The interface B is connected at one side to the power source 50 through a brake lamp 14 and a brake switch 15 and at the other side to the microcomputer 7.

With respect to the relay RL1, a relay coil RL1-1 is connected at one side to one end of the constant voltage circuit 9 through a fixed contact point RL1-2 and at the other side to a collector of a transistor Tr12 of the actuator power source switching section 12. The other fixed contact point RL1-3 of the relay RL1 is connected to one side ends of a vent valve 5a, a vacuum valve 5b and a safety valve 5c provided in the actuator 5.

The relay RL1 operates a movable point RL1-4 to connect the fixed contacts RL1-2 and RL1-3 with each other when the relay coil RL1-1 is excited.

Connected to the microcomputer 7 are the interfaces S, C and B, the other sides of the reset circuit 8 and the constant voltage circuit 9, a base of a transistor Tr10 provided in the vent valve switching section 10, a base of a transistor Tr11 provided in the vacuum valve switching section 11, a base of a transistor Tr12 provided in the safety valve switching section 12, a cruise lamp 16 and the ground.

The microcomputer 7 is provided with a vehicle speed storage means 7a. When the set switch 3a is turned off after the set switch 3a has been turned on under the condition that the main switch 13 is switched on, the vehicle speed storage means 7a stores, in the speed set range, the vehicle speed data that have been transferred from the vehicle speed sensor 2 when the set switch 3a is turned off, and the microcomputer 7 sets the memory vehicle speed. When the set switch 3a of the command switch 3 has been turned on for a constant period of time or longer and the speed decreasing command signal is issued, the memory vehicle speed is renewed by the vehicle speed data that have been transferred from the vehicle speed sensor 2 when the set switch 3a is turned off. Also, when the accelerate command signal is issued while the accelerate switch 3c of the command switch 3 is being turned on, the memory vehicle speed is renewed by the vehicle speed data that have been transferred from the vehicle speed sensor when the accelerate switch 3c is turned off.

When the cruise command signal is transferred by the set switch 3c of the command switch 3, the microcomputer 7 calculates a deviation between the memory vehicle speed of the vehicle speed storage means 7a and the vehicle speed data transferred from the vehicle speed sensor 2. The vehicle speed data transferred from the vehicle speed sensor 2 are stored in the vehicle speed storage means 7a and the change rate for a constant period of time is calculated to obtain an acceleration. A predetermined arithmetic computation is carried out by using the memory vehicle speed and the acceleration and the deviation of the vehicle speed data transferred from the vehicle speed sensor 2. If this calculation result is negative, the speed increasing means 7b is operated for a period of time corresponding to the negative result, whereas if the calculation result is positive, the speed decreasing means 7c is operated for a period of time corresponding to the positive result.

When the speed increasing means 7b of the microcomputer 7 is operated, the transistor Tr12 of the actuator power source switching section 12 is turned on and at the same time, the transistor Tr10 of the vent valve switching section 10 and the transistor Tr11 of the vacuum valve switching section 11 are turned on.

When the speed decreasing means 7c of the microcomputer 7 is operated, the transistor Tr12 of the actuator power source switching section 12 is turned off and at the same time, the transistor Tr10 of the vent valve switching section 10 and the transistor Tr11 of the vacuum valve switching section 11 are turned off.

When the deviation of the vehicle speed data obtained from the vehicle speed sensor 2 relative to the memory vehicle speed of the vehicle speed storage means 7a is larger than a predetermined value Skm/h, the vehicle speed data fall within a range of the vehicle speed which is not greater than the memory vehicle speed, and a value of acceleration at that time is greater than a predetermined value $\alpha$ km/hour.sec ($\alpha$:constant, hour.sec=3600 sec$^2$) the microcomputer 7 has a function to stop the operation of the speed increasing means 7b.

On the other hand, the vent valve 5a and the safety valve 5c provided in the actuator 5 are released to the atmosphere on one side and in communication with a vacuum chamber (not shown) on the other side. If a vacuum level of the vacuum chamber would be enhanced, the throttle valve 4 is driven toward the opening side. When the vacuum level of the vacuum chamber would be lowered, the throttle valve 4 is not driven toward the open side and the throttle valve 4 is returned to the closing side by a return spring (not shown).

Also, the vacuum valve 5b provided in the actuator 5 is connected at one side in fluid communication with an intake manifold (vacuum pressure generating source) of the engine and is in fluid communication with the negative pressure at the other side.

The actuator 5 enhances the vacuum level of the vacuum pressure by turning on the vent valve 5a, the safety valve 5c and the vacuum valve 5b and lowers the vacuum level of the vacuum pressure by turning off the vent valve 5a, the safety valve 5c and the vacuum valve 5b.

The automatic constant speed running apparatus 1 with such an arrangement performs the control based upon the control method shown in FIGS. 2 and 3.

When the main switch 13 is switched on during the travel of the vehicle, the microcomputer 7 of the control unit 6 is kept under a ready condition, and the vehicle data are orderly transferred from the vehicle sensor 2.

Then, when the set switch 3a of the command switch 3 is turned off after the set switch 3a has been turned on within a predetermined period of time, the control is commenced. The vehicle speed storage means 7a stores the vehicle data obtained during the off-operation of the set switch 3a in accordance with the cruise command signal from the set switch 3a. The deviation of the actual vehicle speed data obtained from the vehicle speed sensor relative to the memory vehicle speed stored in the vehicle speed storage means 7a is calculated. The vehicle speed data obtained from the vehicle speed sensor 2 are stored in the vehicle speed storage means 7a and the change rate for a constant period of time is calculated to obtain the acceleration. A predetermined computation is carried out between the deviation of the vehicle speed data obtained from the vehicle speed sensor 2 relative to the memory vehicle speed and the acceleration at that time. If the result is negative, the speed increasing means 7b is operated for a period of time corresponding to the computation result, whereas if the result is positive, the speed decreasing means 7c is operated for a period of time corresponding to the computation result, thereby causing the actual vehicle speed to follow the memory vehicle speed.

When the vehicle runs on a flat road, as shown in FIG. 2, since the judgement as to whether or not the automatic running is effected is YES in step 101, the judgement as to whether or not the constant speed running control is effected is YES in step 102, and the judgement as to whether or not the speed increasing control is effected is NO in step 103, the process is advanced to the step 104 where the output period of time is set based upon the control output computation, i.e., the deviation of the vehicle speed data obtained from the vehicle speed sensor 2 relative the memory vehicle speed. The process is advanced to the step 105 where the output is fed for the set period of time, and is moved to the step 106. Thus, this routine is repeated for the cruise running.

When the set switch 3a of the command switch 3 is not turned off after it has been turned on, the judgement in the step 101 is NO. The process is advanced to the step 106 where the control except for the constant speed running mode and is returned back to the first step 101.

Then, when the vehicle has entered into the ascending sloped road, the predetermined computation result between the deviation of the vehicle speed data obtained from the vehicle speed sensor 2 relative to the memory vehicle speed and the acceleration at that time is negative. Accordingly, the speed increasing means 7b is actuated for the period of time corresponding to the computation result.

The speed increasing means 7b is operated so that the transistor Tr12 of the actuator power source switching section 12, the transistor Tr10 of the vent valve switching section and the transistor Tr11 of the vacuum valve switching section 11 are turned on. As a result, the throttle valve 4 is driven toward the opening side.

When the judgement in step 101 is YES, the judgement in step 102 is YES and the judgement in step 103 is YES, in the next step 107, the memory vehicle speed and the vehicle speed data obtained from the vehicle speed sensor 2 are compared with each other and it is judged whether or not the vehicle data are not greater than the memory vehicle speed and the deviation is greater than a predetermined one Skm/h.

In step 107, if the deviation is smaller than Skm/h, the process is moved to the step 106 through the steps 104 and 105. If the deviation in step 107 is larger than Skm/h, the process is moved to the next step 108.

In step 108, it is judged whether the acceleration obtained by the recognition of the speed change within a constant period is larger than $\alpha$ km/hour.sec.

In step 108, if the acceleration is smaller than a km/hour.sec, the process is moved to the step 106 through the steps 104 and 105. In step 108, if the acceleration is larger than $\alpha 2$ km/h.s, the process is moved to the next step 109 where the operation of the speed increasing means 7b is stopped. The process is returned back to the first step 101 through the steps 105 and 106.

More specifically, as is apparent from FIG. 3, when the vehicle has reached the ascending sloped road at the position d, the vehicle speed data obtained from the vehicle speed sensor 2 arc less than the memory vehicle speed. At the position e where the deviation of the vehicle speed data obtained from the vehicle speed sensor 2 relative to the memory vehicle speed is smaller than the predetermined level Skm/h, the speed increasing control is performed to the actuator 5 by the operation of the speed increasing means 7b. At the position f where the deviation of the vehicle speed data obtained from the vehicle speed sensor relative to the memory vehicle speed is larger than the predetermined level Skm/h and the acceleration at that time is larger than α km/hour.sec, the operation of the speed increasing means 7b is stopped and the speed increasing control to the actuator is disabled.

Thus, since the integrated value of the speed increasing control output during the travel along the ascending sloped road becomes small, the drive of the throttle valve 4 to the opening side may be suppressed to a minimum necessary level. As a result, the shift-down control from the overdrive (OD) to the drive (D3) is not effected by the automatic transmission up to the position g corresponding to the opening degree of the throttle valve 4.

Then, when the ascending sloped road is terminated to the flat road, the cruise travel is performed to cause the actual vehicle speed to follow the memory vehicle speed.

As described above, the control method for the automatic constant speed running apparatus according to the present invention, such a control is effected that the speed increasing control is stopped when the vehicle speed data obtained from the vehicle speed sensor is not greater than the memory vehicle speed, the deviation therebetween is larger than a predetermined level and the acceleration at that time is not smaller than a predetermined level. Accordingly, when the vehicle has reached the ascending sloped road, the smooth cruise travel may be effected under the condition that the shift-down of the automatic transmission is not carried out.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A method for automatically controlling speed of a vehicle with an automatic transmission, the vehicle having a vehicle speed sensor sensing actual speed of the vehicle to generate actual speed data proportional to the actual speed of the vehicle, a command switch operable to generate a cruise command signal, an actuator driving a throttle valve of the vehicle, and a controlling device responsive to the actual speed data generated in said vehicle speed sensor and the cruise command signal supplied from said command switch and including storage means for storing a desired speed datum in response to the cruise command signal supplied from said command switch and signal generating means for selectively generating a speed increasing signal and a speed decreasing signal in response to a difference between the actual speed data generated in said vehicle speed sensor and the desired speed datum stored in said storage means and for supplying the signals to said actuator, the method comprising the steps of;

(a) detecting a difference signal which exceeds a predetermined difference value;

(b) detecting an acceleration value derived from the actual speed data which exceeds a predetermined value, and (c) discontinuing the speed increasing signal being supplied to said actuator when the difference signal exceeds the predetermined difference value and the acceleration value derived from the actual speed data exceeds the predetermined acceleration value.

2. An automatic vehicle speed controlling apparatus for a vehicle with an automatic transmission, the apparatus comprising:

a vehicle speed sensor sensing actual speed of the vehicle for generating actual speed data proportional to the actual speed of the vehicle;

command switch means operable for generating a cruise command signal;

actuator means for driving a throttle valve of the vehicle; and controlling means responsive to the actual speed data generated in said vehicle speed sensor and the cruise command signal supplied from said command switch means, and including storage means for storing a desired speed datum in response to the cruise command signal supplied from said command switch means and means for selectively generating a speed increasing signal and a speed decreasing signal in response to a difference between the actual speed data generated in said vehicle speed sensor and the desired speed datum stored in said storage means and for supplying the signals to said actuator means;

wherein said controlling means further comprises:

decision means having a first detecting means for detecting if the difference between the desired speed datum stored in said storage means and the actual speed data generated in said vehicle speed sensor exceeds a first predetermined value, and a second detecting means for detecting if the acceleration value derived from the actual speed data supplied from said vehicle speed sensor exceeds a second predetermined value; and means for discontinuing generation of the speed increasing signal being supplied to said actuator means in accordance with the decision of said decision means.

* * * * *